(12) United States Patent
Severin et al.

(10) Patent No.: US 8,414,253 B2
(45) Date of Patent: Apr. 9, 2013

(54) TURBOCHARGER VANE

(75) Inventors: Emmanuel Severin, Thaon les Vosges (FR); Lorrain Sausse, Thaon les Vosges (FR); Francis Abel, Thaon les Vosges (FR); Pierre Barthelet, Thaon les Vosges (FR)

(73) Assignee: Honeywell International, Inc., Morristown, NJ (US)

( * ) Notice: Subject to any disclaimer, the term of this patent is extended or adjusted under 35 U.S.C. 154(b) by 762 days.

(21) Appl. No.: 12/256,734

(22) Filed: Oct. 23, 2008

(65) Prior Publication Data
US 2010/0104423 A1 Apr. 29, 2010

(51) Int. Cl.
*F01D 17/16* (2006.01)
(52) U.S. Cl.
USPC ........................................ 415/159; 29/889.21
(58) Field of Classification Search .................. 415/148, 415/150–166, 182.1, 200, 208.1, 208.2, 208.3, 415/208.4, 209.3, 889.21; 29/889, 889.2, 29/889.21, 889.22, 889.23, 889.72, 889.722
See application file for complete search history.

(56) References Cited

U.S. PATENT DOCUMENTS

| 1,540,423 | A | * | 6/1925 | Rees ............................... 415/163 |
| 3,038,698 | A | | 6/1962 | Troyer |
| 5,380,152 | A | | 1/1995 | Sikorski et al. |
| 6,050,775 | A | * | 4/2000 | Erdmann et al. ............... 415/164 |
| 6,129,257 | A | * | 10/2000 | Xu et al. ........................ 228/44.3 |
| 6,676,378 | B2 | * | 1/2004 | Corbin et al. .................. 416/160 |
| 2007/0041832 | A1 | * | 2/2007 | Figura et al. ................ 415/208.1 |

FOREIGN PATENT DOCUMENTS

| DE | 545587 | | 6/1942 |
| DE | 1428171 | | 1/1969 |
| DE | 1033966 | | 7/1985 |
| DE | 19955510 | | 9/2000 |
| GB | 880903 | * | 10/1961 |
| JP | 11-336504 | | 5/1998 |
| WO | 2005/014980 | | 2/2005 |

* cited by examiner

*Primary Examiner* — Fernando L Toledo
*Assistant Examiner* — Victoria K Hall
(74) *Attorney, Agent, or Firm* — The Law Office of John A. Griecci

(57) ABSTRACT

A variable nozzle device including an annular nozzle passage formed by a gap between two opposing wall members and at least one vane rotatably supported in the nozzle passage. The vane is formed by a strip of sheet metal contoured to have an outer aerodynamic profile, and having a hollow interior with surfaces mimicking the outer profile. The vane is affixed to a shaft having a wind-stream portion forming two contact surfaces that conformingly receive opposing portions of the interior surfaces.

10 Claims, 6 Drawing Sheets

TURBOCHARGER VANE

The present invention relates generally to a nozzle for a turbocharger and, more particularly, to a variable nozzle device applicable for use in a turbocharger turbine.

BACKGROUND OF THE INVENTION

Turbochargers for internal combustion engines are conventionally used in order to reduce the fuel consumption and to increase the output of the internal combustion engine.

Since internal combustion engines are subject to widely varying operational states, such as different rotational speeds and load conditions, the turbocharger also experiences differing conditions such as the exhaust flow rate, operational temperatures, and the like. Furthermore, intake requirements of pressurized intake air discharged from the compressor of the turbocharger differ in response to the variation of the operational conditions of the internal combustion engine. At some extremes of these conditions the operational efficiency of the turbocharger is substantially reduced, such as in the choke or surge conditions Therefore, turbochargers have been developed which enable an adaptation to current operational conditions on the turbine side of the turbocharger. The adaptation to operational conditions on the turbine side includes, for example, the variation of the geometry of turbine inflow passages.

The U.S. Pat. No. 4,643,640 proposes a nozzle for passing a fluid such as exhaust gas, comprising a plurality of vanes for directing the flow by exerting a swirl effect to the fluid, and for adjusting the passage area of the nozzle. In such a structure according to the prior art, the vanes are supported rotatably in the passage. By appropriate rotating of the vanes, the swirl effect and/or the passage area can be set in accordance with the operational requirements.

In most variable nozzle turbines, vanes are usually made by either MIM (metal injection molding) or casting processes. U.S. Publication No. 2007/0041832 A1 proposes a rotatably supported vane comprising a sheet metal contour attached to an outer circumference of a portion of a shaft.

There continues to be a need for inexpensive and effective turbocharger components that provide for efficient operation and limit wear while minimizing construction costs. Preferred embodiments of the present invention satisfy these and other needs, and provide further related advantages.

SUMMARY OF THE INVENTION

In various embodiments, the present invention solves some or all of the needs mentioned above, providing an efficiently operating turbocharger with an improved vane structure that can be manufactured at low cost.

According to a first aspect of the present invention, a variable nozzle device comprises an annular nozzle passage formed by a gap between two opposing wall members and at least one vane extending in said nozzle passage. The vane is rotatably supported by a shaft that is rotatable around a shaft axis of rotation. The vane is a sheet of material curved to form an outer surface in the shape of an aerodynamic profile. Although the sheet is unitary, the vane may be considered to have a first sheet portion and a second sheet portion, each sheet portion extending from a leading edge of the vane to a trailing edge of the vane on an opposite side of the vane (from the other sheet portion). The vane is attached to the shaft in an excentered position such that the second sheet portion extends closer to the shaft axis of rotation than the first sheet portion.

Advantageously, a vane can be manufactured under this aspect of the invention by relatively simple processing at low costs. More particularly, it can be formed by wrapping (or otherwise forming) a flat strip of sheet metal into a loop, with inner surfaces of the strip ends adjoined so as to form the contour of the aerodynamic profile. A downstream tip of the vane is formed by attaching the two ends of the strip to one another, such as with one or more spot welds (i.e., using a spot welding process), which provides a simple way to produce the vanes. The shaft can then extend through the vane, and be attached to the inner surfaces of the vane.

The position of the sheet portions, with respect to the shaft axis of rotation, can advantageously provide for the aerodynamic forces to torsionally load the shaft in the same direction throughout the full range of vane orientations to which the shaft is configured to rotate the vane. Additionally, over its range of orientations, the vane's aerodynamic center of pressure can vary in its radial position with respect to the turbine wheel.

As a result of the sheet construction, the vane has an inner surface with a profile mimicking the aerodynamic profile of the outer surface (i.e., the inner surface runs substantially parallel to the outer surface). According to a second aspect of the invention, the shaft has a wind-stream portion defining a first contact surface and a second contact surface, and the first and second contact surfaces are configured with curves that conformingly receive and are attached to respective opposing portions of the vane inner surface.

Advantageously, this provides an extended area over which a strong attachment can be made using cost efficient techniques, such as spot welding. It also provides structural support for the connection between the shaft and the vane, in that the shaft can provide structural rotation forces to the vane based only on geometry, even without considering loads carried by attachment points such as spot welds.

According to a third aspect of the invention, the above aspects can be incorporated into an exhaust gas turbine, which can in turn be incorporated into a turbocharger, providing for an efficiently operating turbine and turbocharger that can be manufactured by relatively simple processing at low costs.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

DETAILED DESCRIPTION OF EMBODIMENTS OF THE INVENTION

Figure 1:
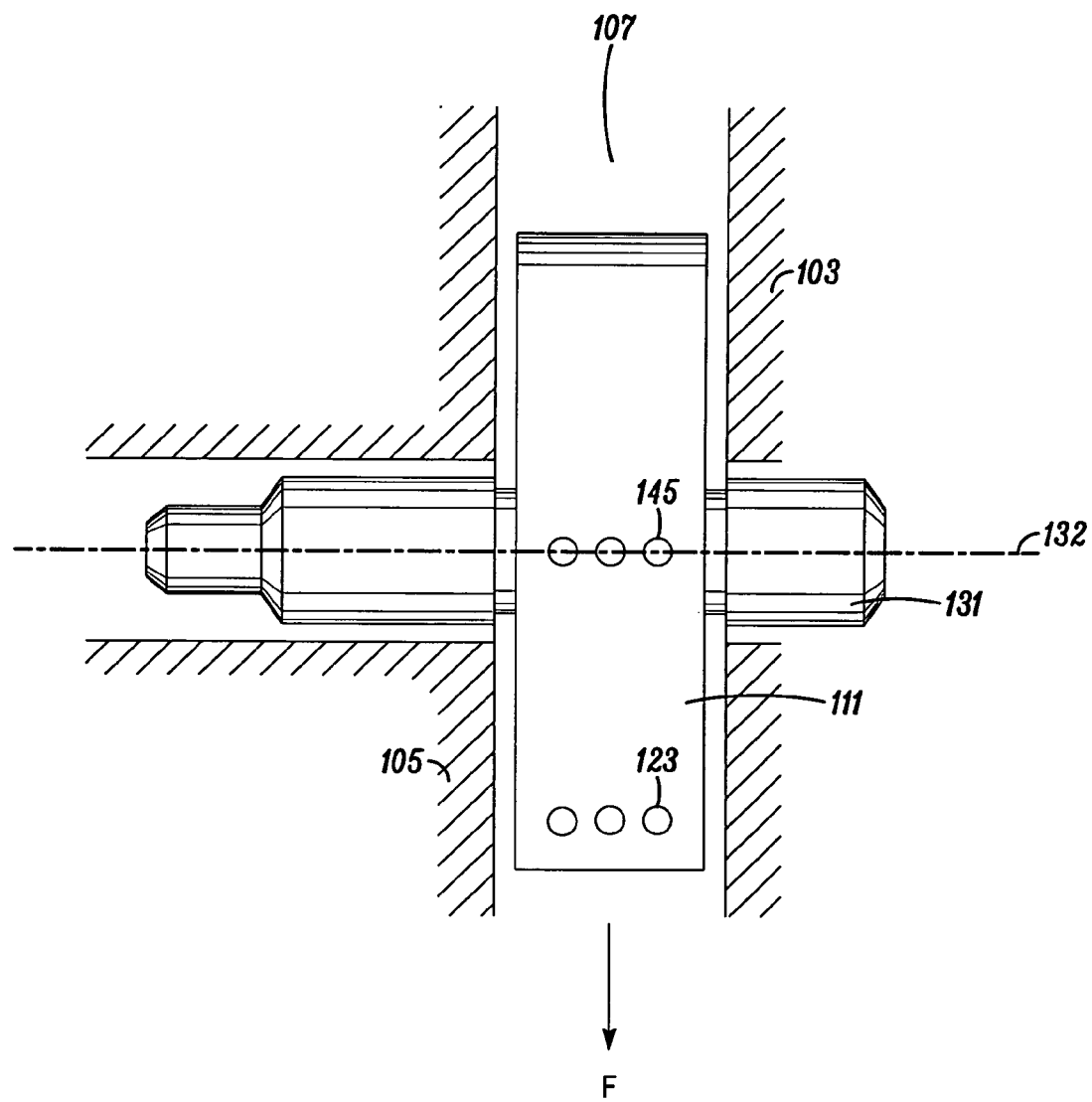
FIG. 1 shows a front view of a variable nozzle device in an open position, incorporating a vane and shaft, according to the present invention.
Figure 2:
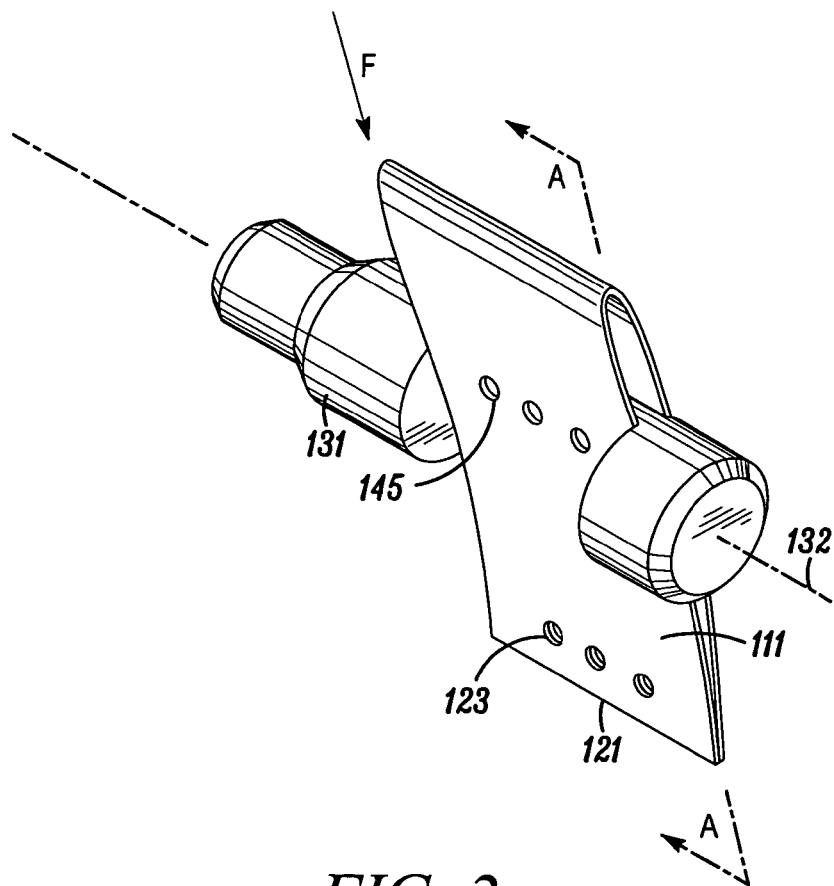
FIG. 2 shows a perspective view of the vane and shaft depicted in FIG. 1.
Figure 3:
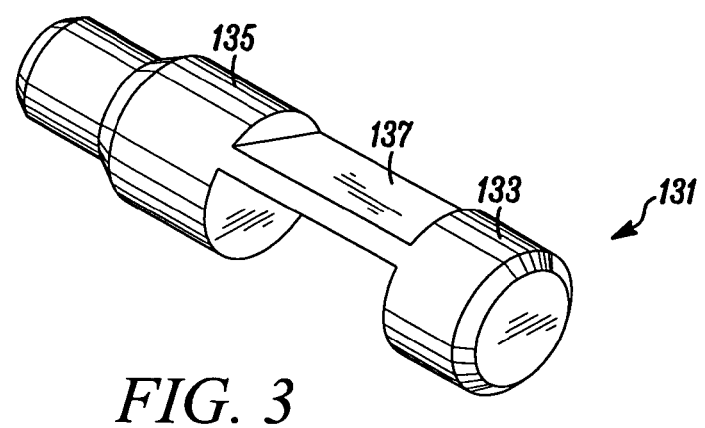
FIG. 3 shows a second perspective view of the shaft depicted in FIG. 1.
Figure 4:
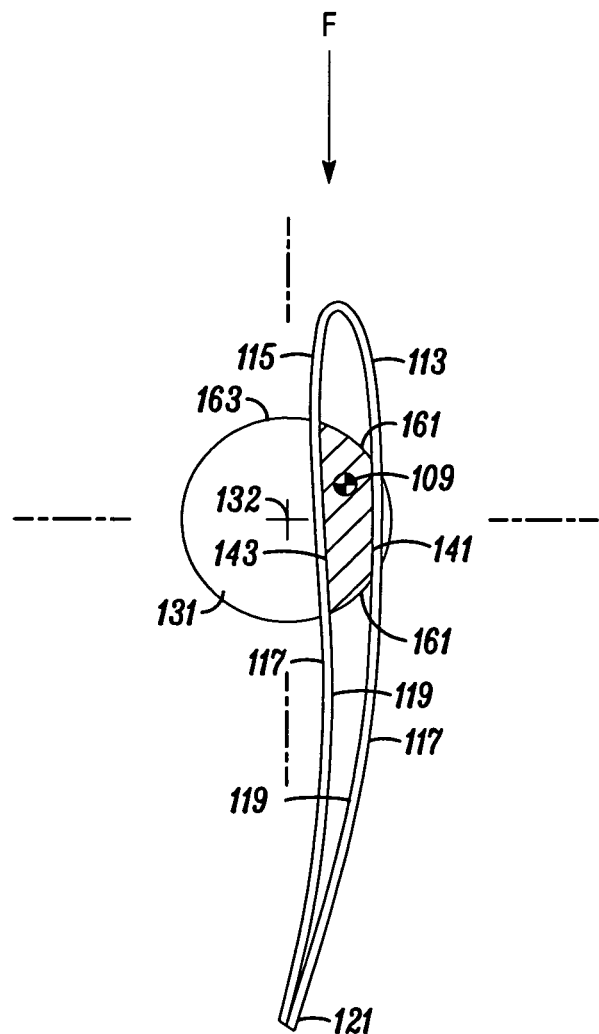
FIG. 4 shows a cross-sectional view of the vane and shaft depicted in FIG. 1, taken along a line A-A of FIG. 2.

The invention summarized above and defined by the enumerated claims may be better understood by referring to the following detailed description, which should be read with the accompanying drawings. This detailed description of particular embodiments of the invention, set out below to enable one to build and use particular implementations of the invention, is not intended to limit the enumerated claims, but rather, it is intended to provide particular examples of them.

Typical embodiments of the present invention reside in a turbocharger having a variable nozzle device that is configured with contoured sheet-metal vanes carried in an excentered location on a rotatable shaft.

With reference to FIGS. 1-6, a turbocharger housing 101 forms a first wall 103 and a second wall 105, which are spaced from each other so as to form an annular passage between the first and second walls, the passage serving as a turbine nozzle 107 for the turbocharger. The nozzle is characterized by an annular shape, and is coaxially disposed around a turbine wheel 211. A flow of a fluid, such as an exhaust gas, to be conveyed to the turbine wheel, moves from an upstream end of the vane (i.e., a leading edge) to a downstream end thereof (i.e., a trailing edge), as indicated by arrows F.

A plurality of rotatable vanes 111 are disposed between the first wall 103 and the second wall 105 in the nozzle 107. The vanes are configured with an aerodynamic, wing-shaped profile characterized by an aerodynamic center of pressure 109 over a full range of vane orientations (i.e., angles of attack) through which the vane is designed to be rotated. These orientations vary from a fully open position through which the fluid freely flows, to a fully closed position substantially restricting fluid flow.

With the variable nozzle device according to the present embodiment, each vane 111 is fixed to a respective shaft 131, and can be rotated through a range of rotation, about an axis of rotation 132 of the shaft, by rotating the shaft. In particular, an adjustment mechanism rotates the shaft of each vane, which in turn each rotates their respective vane between its fully open position and its fully closed position, as is known in the art. It is thereby possible to adjust the rotational position of the vanes through their full range of rotation, within the passage formed by the first wall 103 and the second wall 105, so as to appropriately adapt the flow characteristics of the nozzle.

Each vane 111 is formed by bending a metal sheet strip into an aerodynamic, wing-shaped contour. As a result, the vane is in the form of a hollow, wing-shaped body having axial faces that are open. Although it is typically unitary, the wing-shaped body can be considered to include a first sheet portion 113 and a second sheet portion 115 on opposite sides of the vane (i.e., an upper and a lower surface of the vane), each sheet portion forming an outward-facing outer surface 117 and an inward-facing inner surface 119. A downstream tip end 121 of the vane is formed by contacting the inner surface of the two ends of the strip after forming (e.g., bending) the strip into a vane shape, and bonding the ends to each other, such as by spot-welding in one or more locations to form one or more attach points. Thus, in the present embodiment, the downstream tip is characterized by a pointed configuration having a plurality of spot welds 123.

The vane 111 is supported on the longitudinal (axial) shaft 131, which is characterized by a first longitudinal end 133, a second longitudinal end 135 and a wind-stream portion 137 preferably intermediate the two ends. The wind-stream portion of the shaft is the shaft-portion extending through the annular passage. It extends into and through the hollow interior of the vane via the axial faces, and provides support and control to the vane as it is positioned in the annular passage (which may contain a wind-stream of exhaust gas). The vane is in contact with the wind-stream portion 137 of the shaft on the inner surface of the vane (i.e., in its hollow interior).

More particularly, the wind-stream portion of the shaft includes a first contact surface 141 and a second contact surface 143 configured (i.e., shaped and positioned) to conformingly contact the inner surface of the first sheet portion 113 and the inner surface of the second sheet portion 115, respectively. Thus, the first and second contact surfaces are shaped with curves matching (i.e., conforming to) the aerodynamic profiles of the first and second sheet portions over the portion of their chord-length through which contact with the shaft occurs.

For attaching the vane to the wind-stream portion, those portions of the vane which receive (i.e., are in contact with) the first and second contact surfaces of the wind-stream portion are welded, e.g. by spot-welding. Thus, in the present embodiment, the contact points between the shaft contact surfaces and the vane are characterized by a plurality of attach points such as spot welds 145. Because the contact surfaces conform to the inner surface of the vane along its chord-wise direction, they extend in a chord-wise direction (with respect to the vane), and thus the attach points can be positioned to vary in chord-wise location along the contact surfaces to improve attachment strength.

Alternatively, attachment areas such as line welds 301 (see, e.g., FIG. 6) could be used. In this case, a single attach point can extend in a chord-wise direction along the contact surfaces to improve attachment strength. More generally, it may be said that regardless of whether a plurality of attachment points or one or more attachment areas are used, the (overall) attachment is configured to extend in a chord-wise direction for high attachment strength (with respect to the anticipated vane loads). Other attachment methods (e.g., other welding methods), including ones that can extend in a cord-wise direction, are also within the scope of the invention.

The wind-stream portion 137 of the shaft 131 is configured to support and carry the vane 111. The first end 133 and/or second end 135 of the shaft 131 comprise one or more load-bearing portions configured to react aerodynamic and vibration loads from the vane to the turbocharger housing 101, and actuation portions configured to actuate the vane through a plurality of vane positions, as is known in the art. The load-bearing portions may be cylindrical and conformingly fitted into cylindrical bearing holes in the housing, so as to provide for smooth vane and shaft rotation. The shaft may be made by MIM processes, hot or cold casting processes, machining, or other known methods.

The load-bearing and actuation portions may be unitary (i.e., one portion could serve both functions), or separate portions of the shaft may serve these separate functions. While this embodiment is provided with cylindrical load bearing portions positioned on both longitudinal (axial) ends of the wind-stream portion 137 (i.e., a dual axle design), other configurations, such as a wind-stream portion at a longitudinal end of the shaft, are within the scope of the invention.

The wind-stream portion 137 of the shaft 131 is characterized by a longitudinal cross-section that is non-symmetric and excentered with respect to the longitudinal cross-section of one or both cylindrical ends of the shaft. More particularly, the second sheet portion is closer to the axial center of the shaft (i.e., the center of rotation) than is the first sheet portion. As a result, typically the aerodynamic forces will torsionally load the shaft in the same direction throughout the full range of vane orientations to which the shaft is configured to rotate the vane. Also, over its range of orientations, the vane's aerodynamic center of pressure will vary in its radial position with respect to the turbine wheel 211.

Figure 7:
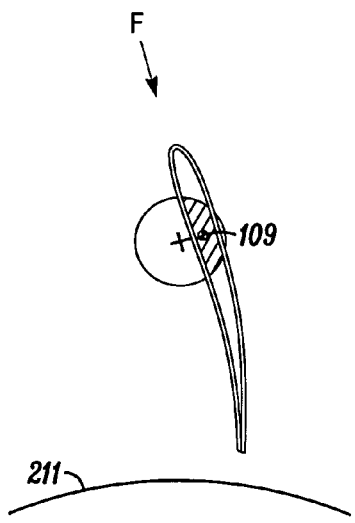
FIG. 7 shows a cross-sectional view of the vane and shaft depicted in FIG. 1, taken along a line A-A of FIG. 2, and depicted in a fully closed position.
Figure 8:
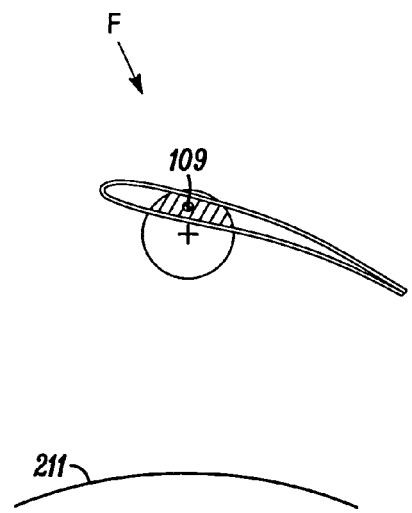
FIG. 8 shows a cross-sectional view of the vane and shaft depicted in FIG. 1, taken along a line A-A of FIG. 2, and depicted in a fully open position.

With respect to that later point, as depicted in FIGS. 7 & 8, the aerodynamic center of pressure 109 shifts radially outward with respect to the turbine wheel 211 when the vane is varied from the fully open position (see, e.g., FIG. 8) (with the nose of the vane pointing away from the turbine wheel) to the fully closed position (see, e.g., FIG. 7) (with the vane extending across the flow from the turbine wheel), i.e., with the vane at the fully closed position, the aerodynamic center of pressure is radially outward from its position with the vane at the fully open position.

The chord-length portions of the sheet portions over which contact with the contact surfaces occurs may oppose one another, and are preferably maximized to the extent possible within the longitudinal cross-section profile of one or both longitudinal ends of the shaft. In other words, the wind-stream portion 137 of the shaft 131 includes two chord-wise ends 161 that align with the periphery 163 of one or both cylindrical ends of the shaft, and the contact surfaces fully extend from one chord-wise end to the other.

As depicted, the vane is far enough excentered such that the wind-stream portion 137 of the shaft 131 does not extend along the axial center of the shaft (i.e., the axis of rotation 132), yet not so excentered so as to fail to provide significant supporting surface area on the contact surface of the shaft. This configuration is characterized by a shaft diameter that is large enough to provide a large excenter as compared to the vane thickness and significantly sized shaft support surfaces for attaching the vane, and yet that is small enough to avoid excessive shaft size.

Figure 5:
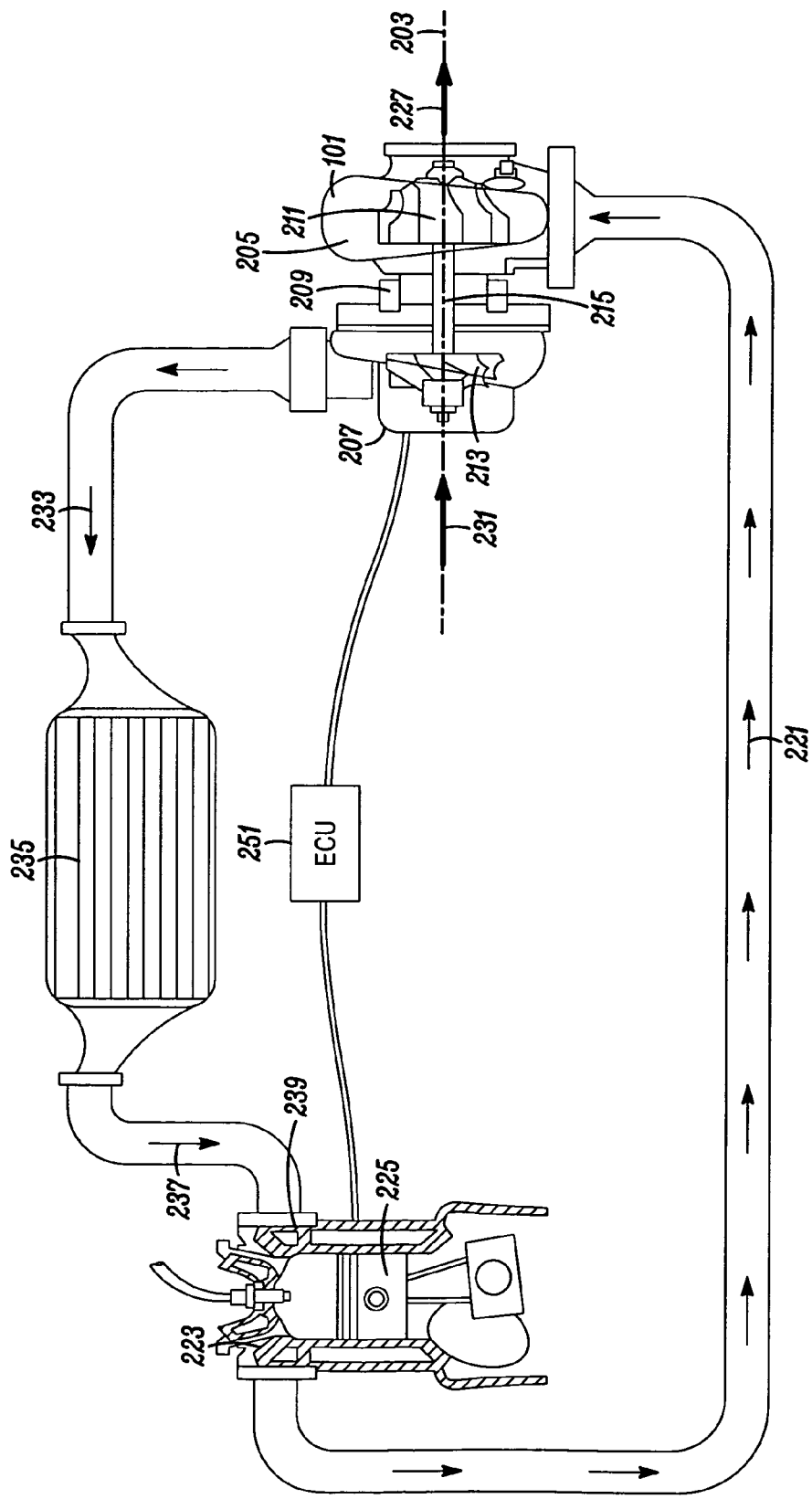
FIG. 5 shows a front conceptual view of a power system incorporating a turbocharger including the variable nozzle device depicted in FIG. 1.
Figure 6:
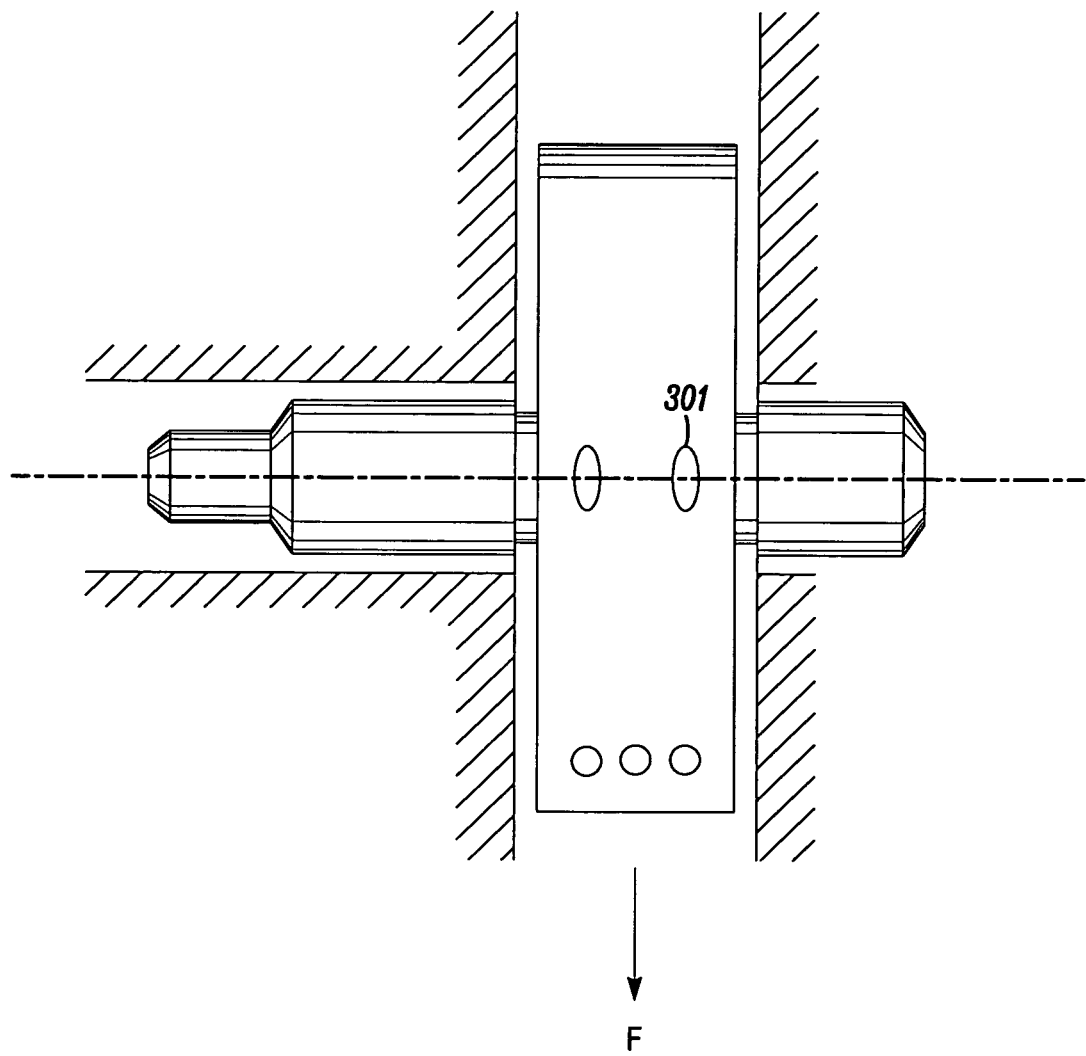
FIG. 6 shows a front view of a variation of the vane and shaft depicted in FIG. 1, having attachments that extend in a chord-wise direction.

With reference to FIG. 5, in a first embodiment of the invention, a turbocharger includes the turbocharger housing 101, a rotor configured to rotate within the turbocharger housing along an axis of rotor rotation 203, axial bearings and journal bearings. The turbocharger housing includes a turbine housing 205, a compressor housing 207, and a bearing housing 209 that connects the turbine housing to the compressor housing.

The rotor includes the turbine wheel 211, which is located substantially within the turbine housing, a compressor wheel 213 located substantially within the compressor housing, and a shaft 215 extending along the axis of rotor rotation, through the bearing housing, to connect the turbine wheel to the compressor wheel. The journal bearings (not shown) are at two locations within the bearing housing, and are configured to restrict the shaft (and thus the rotor) from rotating or translating off the axis of rotor rotation. The axial bearing (not shown) is within the bearing housing, and is configured to restrict the shaft from translating along the axis of rotor rotation.

The turbine housing 205 and turbine wheel 211 form a turbine configured to circumferentially receive a high-pressure exhaust gas stream 221 from an exhaust manifold 223 of an internal combustion engine 225. The turbine wheel (and thus the rotor) is driven in rotation around the axis of rotor rotation 203 by the high-pressure exhaust gas stream, which becomes a lower-pressure exhaust gas stream 227 and is axially released into an exhaust system (not shown).

The compressor housing 207 and compressor wheel 213 form a compressor. The compressor wheel, being driven in rotation by the exhaust-gas driven turbine wheel 211, is configured to compress axially received ambient air 231 into a pressurized air stream 233 that is ejected circumferentially from the compressor. The pressurized air stream is characterized by an increased temperature, over that of the ambient air, due to the compression process, but may be channeled through a convectively cooled charge air cooler 235 configured to dissipate heat from the pressurized air stream, and thereby increase its density. The resulting cooled and pressurized air stream 237 is channeled into an intake manifold 239 on the internal combustion engine.

The internal combustion engine is provided with an engine control unit (ECU) 251 configured to conduct typical ECU functions. These functions may include turbocharger control functions, such as controlling the operation of an actuator configured to actuate the actuation portions of the shaft 131 in order to drive the vane through its full range of rotation.

Although throughout the above description, it is stated that the variable nozzle device is applicable to an exhaust gas turbine, the variable nozzle device may also applicable to variable vanes used in a compressor, such as of a turbocharger.

It is to be understood that the invention comprises both the apparatus and methods for designing and manufacturing the apparatus. Additionally, the various embodiments of the invention can incorporate various combinations of the features described above. In short, the above disclosed features can be combined in a wide variety of configurations within the anticipated scope of the invention.

While particular forms of the invention have been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

What is claimed is:

1. A variable nozzle device for use with a wheel, comprising:
   an annular nozzle passage formed by a gap between two opposing wall members; and
   at least one vane positioned around the wheel in said annular nozzle passage and being rotatably supported by a shaft that is rotatable around a shaft axis of rotation;
   wherein the shaft is configured to rotate the vane through a range of vane orientations between a fully open position and a fully closed position;
   wherein an aerodynamic center of pressure of the vane is positioned with respect to the shaft axis of rotation such that, with the vane at the fully closed position, the aerodynamic center of pressure is radially outward with respect to the wheel from its position with the vane at the fully open position;
   wherein said vane is a sheet of material curved to form an outer surface in the shape of an aerodynamic profile, the vane having a first sheet portion and a second sheet portion, each sheet portion extending from a leading edge of the vane to a trailing edge of the vane on an opposite side of the vane from the other sheet portion, said vane being attached to the shaft;

wherein the second sheet portion extends closer to the shaft axis of rotation than the first sheet portion; and wherein the shaft axis of rotation extends between the first sheet portion and the second sheet portion.

2. The variable nozzle device according to claim 1, wherein the aerodynamic center of pressure of the vane is positioned with respect to the shaft axis of rotation such that aerodynamic forces on the vane from flow through the nozzle device will torsionally load the shaft in the same direction throughout the full range of vane orientations to which the shaft is configured to rotate the vane.

3. A variable nozzle device for use with a wheel, comprising:

an annular nozzle passage formed by a gap between two opposing wall members; and at least one vane positioned around the wheel in said annular nozzle passage and being rotatably supported by a shaft that is rotatable around a shaft axis of rotation;

wherein the shaft is configured to rotate the vane through a range of vane orientations between a fully open position and a fully closed position;

wherein an aerodynamic center of pressure of the vane is positioned with respect to the shaft axis of rotation such that, with the vane at the fully closed position, the aerodynamic center of pressure is radially outward with respect to the wheel from its position with the vane at the fully open position;

wherein the vane is a sheet of material curved to form an outer surface in the shape of an aerodynamic profile;

wherein the vane has an inner surface with a profile mimicking the aerodynamic profile of the outer surface;

wherein the shaft has a wind-stream portion defining a noncircular first contact surface and a noncircular second contact surface, the noncircular first contact surface and the noncircular second contact surface being configured with curves that match and conformingly receive respective portions of the vane inner surface over respective extended chord-wise lengths of the vane inner surface; and wherein the noncircular first contact surface and the noncircular second contact surface are attached to the respective portions of the vane inner surface.

4. The variable nozzle device according to claim 3, wherein:

the wind-stream portion defines grooves in the shaft that form the noncircular first contact surface and the noncircular second contact surface;

the grooves defined by the wind-stream portion of the shaft include two chord-wise ends that align with a periphery of a cylindrical portion of the shaft immediately adjacent the wind-stream portion of the shaft; and the noncircular contact surfaces each fully extend from one chord-wise end to the other of each groove.

5. The variable nozzle device according to claim 3, wherein:

each of the noncircular first contact surface and the noncircular second contact surface has an attachment to its respective portion of the vane inner surface; and the attachment is configured to extend more in a chord-wise direction than in a span-wise direction along the noncircular contact surface.

6. A variable nozzle device for use with a wheel, comprising:

an annular nozzle passage formed by a gap between two opposing wall members; and at least one vane positioned around the wheel in said annular nozzle passage and being rotatably supported by a shaft that is rotatable around a shaft axis of rotation;

wherein the shaft is configured to rotate the vane through a range of vane orientations between a fully open position and a fully closed position;

wherein an aerodynamic center of pressure of the vane is positioned with respect to the shaft axis of rotation such that, with the vane at the fully closed position, the aerodynamic center of pressure is radially outward with respect to the wheel from its position with the vane at the fully open position; and wherein a wind-stream portion of the shaft does not extend along the shaft axis of rotation.

7. A variable nozzle device for use with a wheel, comprising:

an annular nozzle passage formed by a gap between two opposing wall members; and at least one vane positioned around the wheel in said annular nozzle passage and being rotatably supported by a shaft that is rotatable around a shaft axis of rotation;

wherein the shaft is configured to rotate the vane through a range of vane orientations between a fully open position and a fully closed position;

wherein an aerodynamic center of pressure of the vane is positioned with respect to the shaft axis of rotation such that, with the vane at the fully closed position, the aerodynamic center of pressure is radially outward with respect to the wheel from its position with the vane at the fully open position; and wherein the shaft includes cylindrical load bearing portions on two longitudinal ends of a wind-stream portion.

8. A variable nozzle device comprising:

an annular nozzle passage formed by a gap between two opposing wall members; and at least one vane extending in said annular nozzle passage and being rotatably supported by a shaft that is rotatable around a shaft axis of rotation;

wherein said vane is a sheet of material curved to form an outer surface in the shape of an aerodynamic profile, the vane having an inner surface with a profile mimicking the aerodynamic profile of the outer surface;

wherein the shaft has a wind-stream portion defining a noncircular first contact surface and a noncircular second contact surface, the noncircular first contact surface and the noncircular second contact surface being configured with curves that match and conformingly receive respective portions of the vane inner surface over respective extended chord-wise lengths of the vane inner surface;

wherein the noncircular first contact surface and the noncircular second contact surface are attached to the respective portions of the vane inner surface;

wherein the wind-stream portion defines grooves in the shaft that form the noncircular first contact surface and the noncircular second contact surface;

wherein the grooves defined by the wind-stream portion of the shaft include two chord-wise ends that align with a periphery of a cylindrical portion of the shaft immediately adjacent the wind-stream portion of the shaft; and wherein the noncircular first contact surface and the noncircular second contact surface each fully extend from one chord-wise end to the other of each groove.

9. The variable nozzle device according to claim 8, wherein:

each of the noncircular first contact surface and the noncircular second contact surface has an attachment to its respective portion of the vane inner surface; and the attachment is configured to extend more in a chord-wise direction than in a span-wise direction along the contact surface.

10. The variable nozzle device according to claim 8, wherein the shaft includes cylindrical load bearing portions on two longitudinal ends of the wind-stream portion.

\* \* \* \* \*